United States Patent [19]

Trottmann

[11] Patent Number: 5,218,095
[45] Date of Patent: Jun. 8, 1993

[54] PHTHALIMIDYLAZO DYES

[75] Inventor: Martin Trottmann, Therwil, Switzerland

[73] Assignee: Ciba-Geigy Corporation, Ardsley, N.Y.

[21] Appl. No.: 656,270

[22] Filed: Feb. 15, 1991

[30] Foreign Application Priority Data

Feb. 19, 1990 [CH] Switzerland .................. 519/90

[51] Int. Cl.$^5$ .................. C09B 29/036; C09B 29/09; D06P 1/18; D06P 3/42
[52] U.S. Cl. .................. 534/789; 534/596; 534/597; 534/775; 534/887; 8/532; 8/533; 8/539; 8/639; 8/467
[58] Field of Search .................. 534/789, 775

[56] References Cited

U.S. PATENT DOCUMENTS 3,980,634  9/1976  Weaver .................. 534/789

FOREIGN PATENT DOCUMENTS 776561   1/1968  Canada .................. 534/789
51-29557 3/1976  Japan .
1504795  3/1978  United Kingdom .
2016029  9/1979  United Kingdom .

Primary Examiner—Mary C. Lee
Assistant Examiner—Fiona T. Powers
Attorney, Agent, or Firm—Marla J. Mathias; Edward McC. Roberts

[57] ABSTRACT

The novel dispersion dyes of the formula

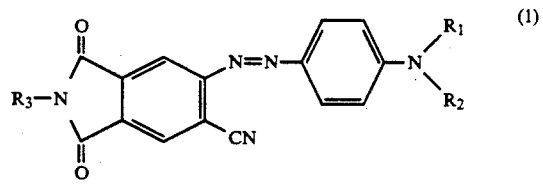

(1)

in which $R_1$ is a $C_2$-$C_8$alkyl radical which is substituted by hydroxyl, halogen, a radical —X—$C_1$-$C_8$alkyl or —X—phenyl, in which X is a bridging member of the formula —O—,

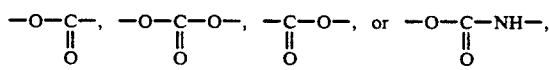

and $R_2$ and $R_3$, independently of one another, are each an unsubstituted $C_1$-$C_8$alkyl radical or a $C_2$-$C_8$alkyl radical which is substituted as mentioned for $R_1$, or in which $R_1$ and $R_2$ together with the nitrogen atom linking them are a heterocyclic radical, are suitable in particular for the dyeing of polyester textile material.

12 Claims, No Drawings

PHTHALIMIDYLAZO DYES

The present invention relates to disperse dyes, processes for their preparation and their use for the dyeing of textile materials.

The dyes according to the invention have the formula

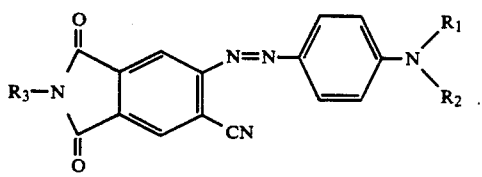

in which $R_1$ is a $C_2$-$C_8$alkyl radical which is substituted by hydroxyl, halogen, a radical $-X-C_1$-$C_8$alkyl or $-X-$phenyl, in which X is a bridging member of the formula $-O-$

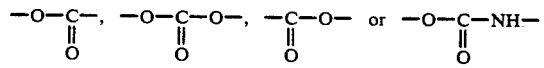

and $R_2$ and $R_3$, independently of one another, are each an unsubstituted $C_1$-$C_8$alkyl radical or a $C_2$-$C_8$alkyl radical which is substituted as mentioned for $R_1$, or in which $R_1$ and $R_2$ together with the nitrogen atom linking them are a heterocyclic radical.

An unsubstituted alkyl radical as $R_2$ and $R_3$ can be straight-chain or branched or also cyclic. Examples are methyl, ethyl, n- or isopropyl, n-, iso-, sec- or tert-butyl, straight-chain or branched pentyl, hexyl, heptyl or octyl, cyclopentyl or cyclohexyl. Of these, $C_1$-$C_4$alkyl radicals, in particular methyl or ethyl, are preferred.

A $C_2$-$C_8$alkyl radical substituted by hydroxyl, halogen, $-X-C_1$-$C_8$alkyl or $-X-$phenyl as $R_1$, $R_2$ or $R_3$ can be, like the $-X-C_1$-$C_8$alkyl radical, straight-chain, branched or cyclic. The abovementioned alkyl radicals are suitable.

Of these, $C_2$-$C_4$alkyl radicals which are substituted by hydroxyl, chlorine or an $-X-C_1$-$C_4$alkyl radical are preferred, in which X is a bridging member of the formula $-O-$,

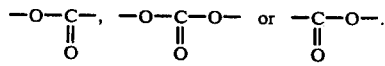

Very particularly preferred bridging members X have the formula

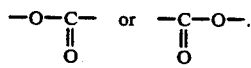

$R_1$ and $R_2$ together with the nitrogen atom linking them can also be a heterocyclic radical, for example a pyrrolidine, piperidine, morpholine or piperazine radical.

Examples of halogen are fluorine or bromine or in particular chlorine.

The radicals $R_1$, $R_2$ and $R_3$ can be mono-or polysubstituted by the substituents mentioned.

Examples of suitable substituted $C_2$-$C_8$alkyl radicals are hydroxyethyl, hydroxypropyl, chloroethyl, methoxyethyl, ethoxypropyl, methoxycarbonylethyl, ethoxycarbonylethyl, acetoxyethyl, propionyloxyethyl, methoxycarbonyloxyethyl, ethoxycarbonyloxyethyl, butylaminocarbonyloxyethyl or chloroethylaminocarbonyloxyethyl.

The phenyl radical in an $-X-$phenyl-substituted alkyl radical as $R_1$, $R_2$ or $R_3$ can be substituted, for example by $C_1$-$C_4$alkyl, $C_1$-$C_4$alkoxy or halogen.

Particularly suitable dyes according to the invention have the formula (1), in which $R_2$ and $R_3$, independently of one another, are each an unsubstituted $C_1$-$C_4$alkyl radical or a $C_2$-$C_4$alkyl radical which is substituted by hydroxyl, chlorine or a radical $-X-C_1$-$C_4$alkyl, in which X is a bridging member of the formula $-O-$,

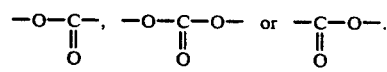

Of these, those in which $R_2$ and $R_3$, independently of one another, are each methyl, ethyl, hydroxyethyl or $C_2$-$C_4$alkyl which is substituted by a radical $-X-C_1$-$C_4$alkyl, in which X is a bridging member of the formula

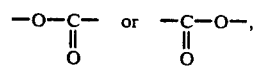

are particularly preferred.

A preferred embodiment of the invention relates to azo dyes of the formula (1), in which $R_1$ is a $C_2$-$C_4$alkyl radical which is substituted by hydroxyl, chlorine or a radical $-X-C_1$-$C_4$alkyl, in which X is a bridging member of the formula $-O-$,

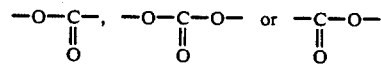

and $R_2$ and $R_3$, independently of one another, are each methyl, ethyl, hydroxyethyl or $C_2$-$C_4$alkyl, which is substituted by a radical $-X-C_1$-$C_4$alkyl, in which X is a bridging member of the formula

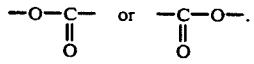

The dyes according to the invention are prepared in a manner known per se, for example by exchanging, in a compound of the formula

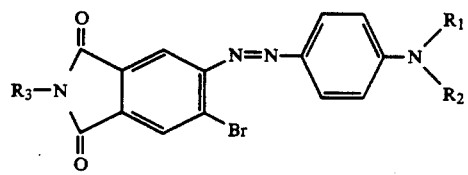

in which $R_1$, $R_2$ and $R_3$ are as defined under the formula (1), CN for Br. The cyano exchange is carried out under conditions known per se, for example by reacting a compound of the formula (2) with metal cyanides, preferably CuCN, in organic medium at temperatures of 20° to 220° C.

The compounds of the formula (2) are known or can be prepared in a manner known per se, for example by diazotising a phthalimide of the formula

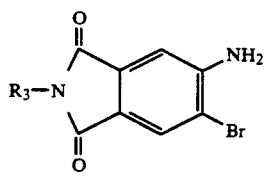 (3)

and coupling the product onto a coupling component of the formula

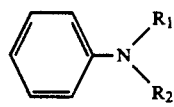 (4)

in which $R_1$, $R_2$ and $R_3$ are as defined under the formula (1).

The compounds of the formula (3) and (4) are known or can be prepared in a manner known per se and the diazotisation and coupling are carried out in the usual manner.

Dyes of the formula (1), in which $R_1$, $R_2$ or $R_3$ are a radical of the formula -alkylene-X-alkyl can also be prepared by first preparing a dye containing a precursor of these radicals, for example a hydroxyalkyl group, and then converting this group into a radical of the formula -alkylene-X-alkyl.

The compounds according to the invention of the formula (1) can be used as dyes for the dyeing and printing of semisynthetic and in particular synthetic hydrophobic fibre materials, in particular textile materials. Textile materials made of blended fabrics containing semisynthetic or synthetic hydrophobic textile materials of this type can also be dyed or printed by means of the compounds according to the invention.

Suitable semisynthetic textile materials are in particular secondary cellulose acetate and cellulose triacetate.

Synthetic hydrophobic textile materials in particular comprise linear, aromatic polyesters, for example those prepared from terephthalic acid and glycols, in particular ethylene glycol, or condensation products from terephthalic acid and 1,4-bis(hydroxymethyl)cyclohexane; from polycarbonates, for example those from α,α-dimethyl-4,4'-dihydroxydiphenylmethane and phosgene, fibres based on polyvinyl chloride and polyamide.

The compounds according to the invention are applied to the textile materials using known dyeing processes. For example, polyester fibre materials are dyed by the exhaust method from an aqueous dispersion in the presence of conventional anionic or nonionic dispersants and, if desired, customary carriers at temperatures between 80° and 140° C. Secondary cellulose acetate is preferably dyed at temperatures between about 65° to 85° C. and cellulose triacetate at temperatures of up to 115° C.

The novel dyes do not or only slightly stain adjacent wool and cotton in the dyebath (very good reserve), making them also suitable for the dyeing of polyester-/wool and polyester/cellulose fibre blended fabrics.

The dyes according to the invention are suitable for dyeing by the thermosol process, by the exhaust method and for printing processes.

The textile material mentioned can be present in a wide range of processing forms, for example as fibre, filament or nonwoven fabric, as woven fabric or knitted fabric.

It is advantageous to convert the dyes according to the invention before use into a dye preparation. To this end, the dye is milled to an average particle size between 0.1 and 10 microns. The milling can take place in the presence of dispersants. For example, the dried dye is milled together with a dispersant or is kneaded as a paste together with a dispersant and then dried in vacuo or by atomisation. The preparations thus obtained can then, after addition of water, be used for preparing printing pastes and dyebaths.

For printing, the customary thickeners are used, for example modified or unmodified natural products, for example alginates, British gum, gum arabic, crystalline gum, locust bean flour, tragacanth, carboxymethylcellulose, hydroxyethylcellulose, starch or synthetic products, for example polyacrylamide, polyacrylic acid or copolymers thereof or polyvinyl alcohols.

The dyes according to the invention give the materials mentioned, in particular the polyester material, level violet or red hues having very good wear fastness properties, such as, in particular, good light fastness, fastness to dry heat setting, pleating, chlorine and wet fastness, such as water, perspiration and wash fastness; the dyeings are furthermore distinguished by very good rub fastness. The good thermomigration fastness of the dyeings obtained may be mentioned in particular.

The dyes according to the invention can also be readily used for preparing combination shades together with other dyes. It is of course also possible to use mixtures of the dyes according to the invention with one another.

The present invention also relates to the abovementioned use of the azo compounds according to the invention of the formula (1) and to a process for the dyeing or printing of semisynthetic or synthetic hydrophobic fibre material, in particular textile material, which comprises applying one or more compounds of the formula (1) to the material mentioned or incorporating it therein. The hydrophobic fibre material mentioned is preferably textile polyester material. Further substrates which may be treated by the process according to the invention and preferred process conditions can be found above under the detailed explanation on the use of the compounds according to the invention.

The invention further relates to the hydrophobic fibre material, preferably polyester textile material, dyed or printed by the process mentioned.

The dyes according to the invention of the formula (1) are furthermore suitable for modern recording processes, for example thermal transfer printing.

The examples which follow illustrate the invention in more detail without limiting it thereto. Parts and percentages are by weight, unless stated otherwise.

EXAMPLE 1

A total of 60 g of concentrated sulfuric acid and 32 g of 40% nitrosylsulfuric acid are added dropwise to 100 ml of a previously introduced mixture of 1 part by volume of propionic acid and 5 parts by volume of acetic acid with cooling. 27 g of N-ethyl-4amino-5-bromophthalimide are added at 0°-10° C. in portions and dissolved. After the addition of another 100 ml of the abovementioned acid mixture, the solution is stirred at 0°-5° C. for 2 hours. Excess nitrosylsulfuric acid is removed by adding about 1 g of urea.

The diazo solution obtained is added dropwise to a solution of 18 g of N,N-bis(hydroxyethyl)aniline in 100 ml of the avovementioned acid mixture and 20 g of ice at 0°-10° C. over a period of 1 hour. A pH of 3-5 is maintained by adding 30% sodium hydroxide solution. The product is filtered off, washed and dried to give 35.5 g of red crystals of the compound of the formula

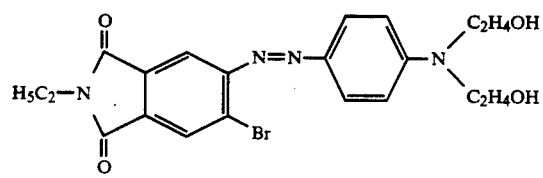

of melting point 135°-140° C.

EXAMPLE 2

32.3 g of the dye described in Example 1 are suspended in 80 ml of dimethylformamide. After adding 9.4 g of copper (I) cyanide, the mixture is stirred at 100° C. for 2 hours. The hot mixture is poured into a solution of 38 g of iron (III) chloride hexahydrate in 800 ml of ice-water. The product is filtered off, washed and dried to give 28 g of a black substance of the compound of the formula

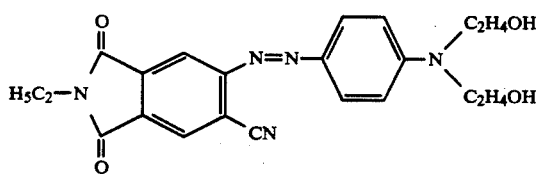

of melting point 130°-160° C. For purification, the crude product is purified on silica gel by column chromatography using acetone as the eluent. Black crystals of melting point 223°-225° C. are obtained. The dye dyes polyester material bluish red.

EXAMPLE 3

Analogously, as described in Example 1, 27 g of N-ethyl-4-amino-5-bromophthalimide are diazotised and coupled onto 26.5 g of N,N-bis(acetoxyethyl)aniline. 44.3 g of red crystals of the compound of the formula

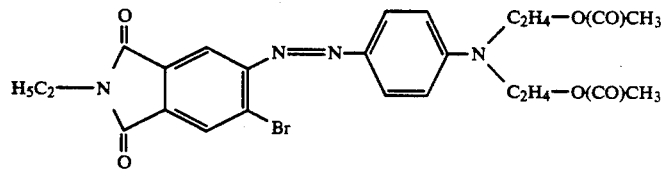

of melting point 123°-128° C. are obtained. For purification, the crude product is suspended in 300 ml of ethanol, and the mixture is stirred at the reflux temperature for 2 hours. The product is filtered off (while warm), washed and dried to give 31.9 g of red crystals of melting point 136°-138° C.

EXAMPLE 4

Analogously, as described in Example 2, 27.3 g of the dye described in Example 3 are reacted with 6.7 g of copper (I) cyanide to give 27 g of the crude product of the formula

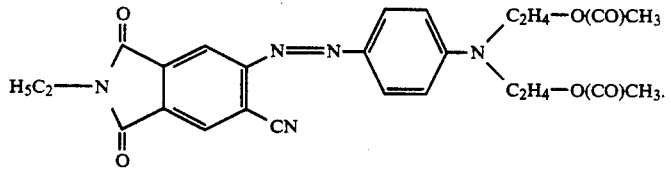

The purification is carried out as described in Example 3 and gives 17.5 g of black crystals of melting point 162°-165° C.

The dye dyes polyester material in red hues. The dyes have good fastness properties, in particular good thermal migration fastness.

EXAMPLE 5

2 g of the dye described in Example 2, 20 ml of pyridine and 3 g of propionic anhydride are heated to 80° C. After stirring for 2 hours, the mixture is poured into 200 ml of ice-water. Filtration, washing and drying gives 2.3 g of crude product. For purification, the crude product is stirred in 20 ml of ethanol at the reflux temperature for 2 hours. Filtration (while warm), washing and drying gives 1.9 g of black crystals of the compound of the formula

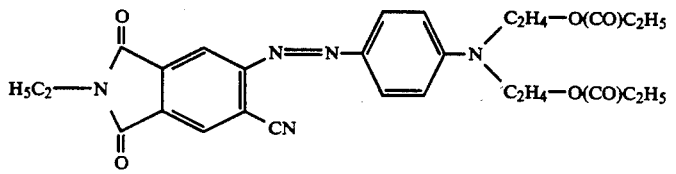

of melting point 131°-133° C. The dye dyes polyester material in red hues having good fastness properties.

EXAMPLE 6

1 g of the dye described in Example 2 is dissolved in 10 ml of pyridine, and 1.1 g of ethyl chloroformate are added dropwise at room temperature. The mixture is then heated to 50° C. and poured into 150 ml of ice-water. The product is filtered off, washed and dried to give 1.1 g of red crystals of the compound of the formula

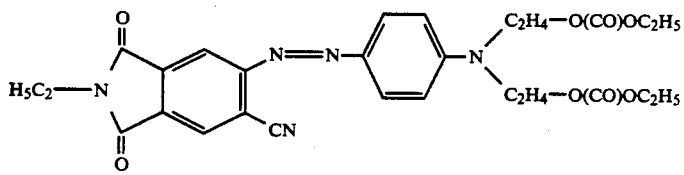

of melting point 177°–179° C.

The dye dyes polyester material in red hues.

EXAMPLE 7

The procedure described in Example 1 is repeated, except that an equivalent amount of N-(n-propyl)-4-amino-5-bromophthalimide is used instead of N-ethyl-4-amino-5-bromophthalimide, to give the compound of the formula

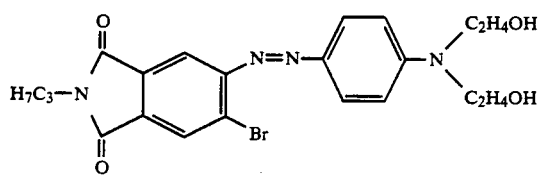

The dye of the formula

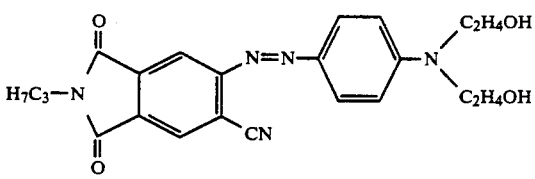

is then obtained by cyano exchange according to the procedure described in Example 2 in the form of black crystals of melting point 180°–185° C. It dyes polyester fabric in bluish-red shades having good fastness properties.

EXAMPLE 8

1 g of the dye prepared according to Example 7 is suspended in 10 ml of dimethylformamide, and 0.1 g of diazabicyclooctane and 0.7 g of butyl isocyanate are added. After stirring at 50° C. for 4 hours, 1 ml of methanol is added. After a further hour at 50° C., the mixture is poured into 100 ml of ice-water. The product is filtered off to give a black crude product of the formula

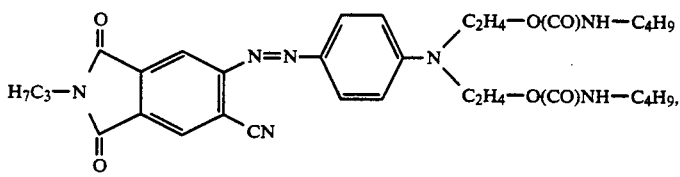

which is purified by adding 10 ml of tert-butyl methyl ether and stirring the mixture at the reflux temperature for 2 hours. The product is filtered off, washed and dried to give 0.5 g of black crystals of melting point 90°–100° C.

The dye dyes polyester material in red hues.

EXAMPLES 9–17

Analogously, as described in Examples 2, 4–6 and 8, the dyes listed in the table below can be prepared. They dye polyester textile material in the hues listed in the last column.

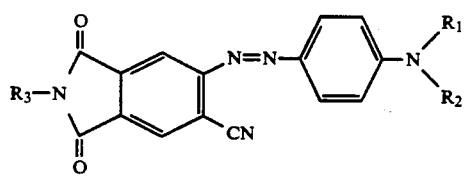

| Ex. | $R_3$ | $R_2$ | $R_1$ | Hue on polyester |
|---|---|---|---|---|
| 9 | $-C_2H_5$ | $-C_2H_5$ | $-C_2H_4-O-\underset{\underset{O}{\|\|}}{C}-C_2H_5$ | bluish red |

-continued

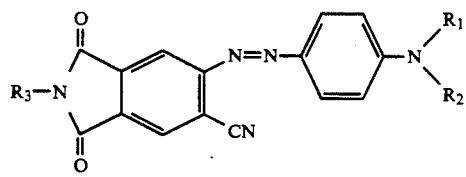

| Ex. | R₃ | R₂ | R₁ | Hue on polyester |
|---|---|---|---|---|
| 10 | $-C_3H_6-O-CH_3$ | $-C_2H_5$ | $-C_2H_4-O-\underset{\underset{O}{\|}}{C}-CH_3$ | bluish red |
| 11 | $-C_3H_6-O-CH_3$ | $-C_2H_4-O-\underset{\underset{O}{\|}}{C}-CH_3$ | $-C_2H_4-O-\underset{\underset{O}{\|}}{C}-CH_3$ | red |
| 12 | $-C_2H_5$ | $-C_2H_4-O-CH_3$ | $-C_2H_4-O-CH_3$ | bluish red |
| 13 | $-C_3H_6-O-\underset{\underset{O}{\|}}{C}-CH_3$ | $-C_2H_4-O-CH_3$ | $-C_2H_4-O-CH_3$ | bluish red |
| 14 | $-C_2H_5$ | $-C_2H_4-\underset{\underset{O}{\|}}{C}-O-CH_3$ | $-C_2H_4-\underset{\underset{O}{\|}}{C}-O-CH_3$ | red |
| 15 | $-C_2H_5$ | $-C_2H_4-O-\underset{\underset{O}{\|}}{C}-NH-C_2H_4Cl$ | $-C_2H_4-O-\underset{\underset{O}{\|}}{C}-NH-C_2H_4Cl$ | bluish red |
| 16 | $-CH_3$ | $-C_2H_4-O-\underset{\underset{O}{\|}}{C}-NH-C_4H_9$ | $-C_2H_4-O-\underset{\underset{O}{\|}}{C}-NH-C_4H_9$ | bluish red |
| 17 | $-CH_2-CH\begin{smallmatrix}C_4H_9\\ \\C_2H_5\end{smallmatrix}$ | $-C_2H_4-O-\underset{\underset{O}{\|}}{C}-NH-C_4H_9$ | $-C_2H_4-O-\underset{\underset{O}{\|}}{C}-NH-C_4H_9$ | bluish red |

EXAMPLE 18

1 g of the dye described in Example 4 is milled together with 17 g of water and 2 g of a commercially available dispersant of the dinaphthylmethanedisulfonate type in a sandmill and the mixture is converted into a 5% aqueous dispersion.

This formulation is used to produce a 1% dyeing (relative to pigment and substrate) on polyester fabric at 130° C. by the HT exhaust method, which is then reduction cleared. The red dyeing thus obtained has very good wear fastness properties and in particular excellent thermomigration fastness.

The same good fastness properties can be achieved when polyester fabric is dyed therewith by the thermosol process (10 g/l of dye, liquor pickup 50%, fixation temperature 210° C.).

The thermomigration fastness is tested by finishing the dyed fabric with a textile softener of the distearyldiethylenetriamine type and then heating it to 165° C. over a period of 40 seconds. Rub fastness and wash fastness (60° C.) of the specimen are then tested.

EXAMPLE 19

6.75 g of the bromine-containing dye described in Example 3,
75 ml of n-butyl acetate,
26 ml of formamide
2.5 g of copper(II) acetate
6.25 g of anhydrous sodium acetate and
5 ml of acetic anhydride are stirred at 110° C. After 1 hour, another
2.5 ml of acetic anhydride are added. After another 4 hours of stirring at 110° C., the mixture is cooled, and 250 ml of water are added. The product is filtered off and dried to give 3.7 g of the cyano-containing dye described in Example 4.

EXAMPLE 20

Analogously, as described in Examples 2, 4–6, 8 and 19, the dye of the formula

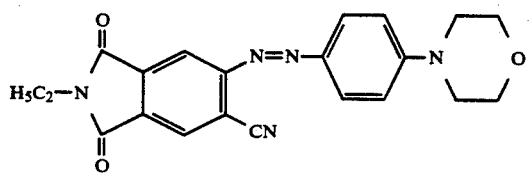

is obtained as a red powder of melting point 229°–232° C. The dye dyes polyester material in red hues.

EXAMPLE 21

A mixture of 0.6 g of acetic anhydride and 0.8 g of propionic anhydride is added dropwise to 2 g of the dye described in Example 2 in 10 ml of pyridine. After stirring at 80° C. for 2 hours, the mixture is poured into ice-water, and the product is filtered off. The crude product is added to 10 ml of ethanol, and the mixture is stirred at the reflux temperature for 1 hour. After cooling, the product is filtered off and dried to give 2 g of black crystals of melting point 120°-128° C. They are a mixture of the following dyes:

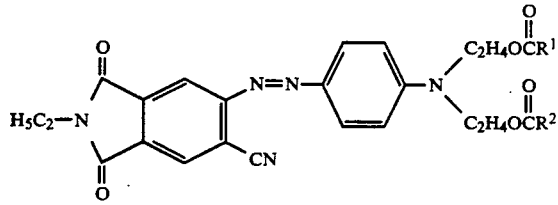

-continued $R^1 = R^2 = -CH_3$ (1 part)
$R^1 = R^2 = -C_2H_5$ (1 part)
$R^1 = -CH_3, R^2 = -C_2H_5$ (2 parts)

The mixture dyes polyester material in red hues.

EXAMPLES 22-58

Analogously, as described in Examples 2, 4-6, 8 and 19, the dyes listed in the table below can be prepared. They dye polyester textile material in the hues listed in the last column.

| Ex. | $R_3$ | $R_2$ | $R_1$ | Hue on polyester |
|---|---|---|---|---|
| 22 | $-C_2H_5$ | $-C_2H_5$ | $-CH_2\overset{OH}{\underset{\phantom{x}}{C}}HCH_2OH$ | ruby |
| 23 | $-CH_3$ | $-C_2H_4O\overset{O}{\overset{\|}{C}}CH_3$ | $-C_2H_4O\overset{O}{\overset{\|}{C}}CH_3$ | red |
| 24 | $-C_2H_5$ | $-C_2H_5$ | $-C_2H_4OH$ | bluish red |
| 25 | $-C_3H_7$ | $-C_2H_4O\overset{O}{\overset{\|}{C}}CH_3$ | $-C_2H_4O\overset{O}{\overset{\|}{C}}CH_3$ | red |
| 26 | $-CH_2CH\overset{C_2H_5}{\underset{C_4H_9}{\phantom{x}}}$ | $-C_2H_4O\overset{O}{\overset{\|}{C}}CH_3$ | $-C_2H_4O\overset{O}{\overset{\|}{C}}CH_3$ | red |
| 27 | $-C_3H_6OCH_3$ | $-C_2H_4OH$ | $-C_2H_4OH$ | bluish red |
| 28 | $-C_3H_6OCH_3$ | $-C_2H_5$ | $-C_2H_4OH$ | bordeaux |
| 29 | $-C_2H_5$ | $-C_2H_5$ | $-C_2H_4O\overset{O}{\overset{\|}{C}}C_6H_5$ | bordeaux |
| 30 | $-C_2H_5$ | $-C_2H_4O\overset{O}{\overset{\|}{C}}C_6H_5$ | $-C_2H_4O\overset{O}{\overset{\|}{C}}C_6H_5$ | red |
| 31 | $-C_2H_5$ | $-C_2H_5$ | $-C_2H_4O\overset{O}{\overset{\|}{C}}NHC_4H_9$ | bluish red |
| 32 | $-C_2H_5$ | $-C_2H_5$ | $-C_2H_4O\overset{O}{\overset{\|}{C}}NHC_6H_5$ | bluish red |
| 33 | $-C_2H_5$ | $-C_2H_5$ | $-C_2H_4O\overset{O}{\overset{\|}{C}}CH_3$ | bluish red |
| 34 | $-C_2H_5$ | $-C_2H_5$ | $-C_2H_4O\overset{O}{\overset{\|}{C}}CH\overset{CH_3}{\underset{CH_3}{\phantom{x}}}$ | bluish red |
| 35 | $-C_2H_5$ | $-C_2H_5$ | $-C_2H_4O\overset{O}{\overset{\|}{C}}CH_2CH\overset{CH_3}{\underset{CH_3}{\phantom{x}}}$ | bluish red |
| 36 | $-C_2H_5$ | $-C_2H_4O\overset{\phantom{O}}{\overset{\|}{C}}CH\overset{CH_3}{\underset{CH_3}{\phantom{x}}}$ | $-C_2H_4O\overset{O}{\overset{\|}{C}}H\overset{CH_3}{\underset{CH_3}{\phantom{x}}}$ | red |

-continued

| Ex. | R₃ | R₂ | R₁ | Hue on polyester |
|---|---|---|---|---|
| 37 | —C₂H₅ | —C₂H₄OCC₃H₇ (O) | —C₂H₄OCC₃H₇ (O) | red |
| 38 | —C₂H₅ | —C₂H₄OCH₃ | —C₂H₄OCH₃ | bluish red |
| 39 | —CH₃ | —C₂H₅ | —C₂H₄OCOC₂H₅ (O) | bluish red |
| 40 | —C₂H₄COCH₃ (O) | —C₂H₅ | —C₂H₄OCCH₃ (O) | bluish red |
| 41 | —C₂H₄OCH₃ | —C₂H₅ | —C₂H₄OC₂H₅ | bluish red |
| 42 | —C₂H₄OCH₃ | —C₂H₄OCCH₃ (O) | —C₂H₄OCCH₃ (O) | red |
| 43 | —C₃H₆OCCH₃ (O) | —CH₃ | —C₂H₄OCCH₃ (O) | bluish red |
| 44 | —C₃H₆OCNHC₆H₅ (O) | —CH₃ | —C₂H₄OCNHC₄H₉ (O) | bluish red |
| 45 | —C₄H₉ | —C₂H₄COCH₃ (O) | —C₂H₄OCCH₃ (O) | red |
| 46 | —C₃H₇ | —CH₃ | —C₂H₄OCH₃ | bluish red |
| 47 | —CH₃ | —C₂H₄OCCH₃ (O) | —C₂H₄OC₂H₅ | bluish red |
| 48 | —C₂H₄OCH₃ | —C₂H₄COC₂H₅ (O) | —C₂H₄COC₂H₅ (O) | red |
| 49 | —C₂H₄COC₂H₅ (O) | —C₂H₄OCH₃ | —C₂H₄OCH₃ | bluish red |
| 50 | —C₂H₄COC₂H₅ (O) | —C₂H₄OCC₂H₅ (O) | —C₂H₄OCC₂H₅ (O) | red |
| 51 | —C₂H₄OCOC₂H₅ (O) | —C₄H₉ | —C₂H₄OCOC₂H₅ (O) | bordeaux |
| 52 | —C₃H₆OCCH₃ (O) | —C₂H₄OCCH₃ (O) | —C₂H₄OCCH₃ (O) | red |
| 53 | —C₂H₄OCOC₂H₅ (O) | —C₃H₇ | —C₂H₄OC₂H₅ | ruby |
| 54 | —C₂H₄OCH₃ | —C₂H₄OCH₃ | —C₂H₄OCH₃ | bluish red |
| 55 | —C₂H₄OCNHC₄H₉ (O) | —C₂H₄COC₂H₅ (O) | —C₂H₄OCC₂H₅ (O) | red |
| 56 | —C₂H₄OCOCH₃ (O) | —C₂H₄OCOCH₃ (O) | —C₂H₄OCOCH₃ (O) | red |
| 57 | —C₂H₅ | —C₂H₅ | —C₂H₄COC₂H₅ (O) | red |
| 58 | —C₂H₄OCCH₃ (O) | —CH₃ | —C₂H₄COCH₃ (O) | red |

What is claimed is:
1. A dye of the formula

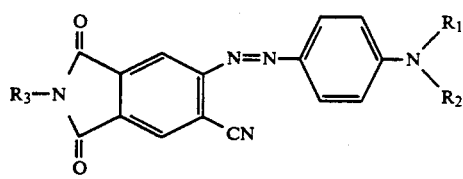

(1)

in which
R₁ is a C₂–C₈alkyl radical which is substituted by hydroxyl, a radical —X—C₁–C₈alkyl or —X—phenyl, in which X is a bridging member of the formula —O—,

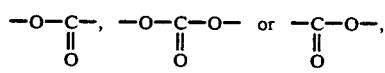

R₂ is an unsubstituted C₁–C₈alkyl radical or a C₂–C₈alkyl radical which is substituted by hydroxyl, a radical —X—C₁–C₈alkyl or —X—phenyl, in which X is a bridging member of the formula —O—,

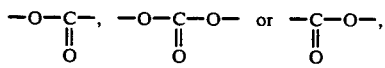

with the priviso that R₁ is different from R₂ and R₃ is an unsubstituted C₁–C₈alkyl radical or a C₂–C₈alkyl radical substituted by C₁–C₈alkoxy.

2. A dye according to claim 1, in which R₁ is a C₂–C₄alkyl radical which is substituted by hydroxyl or a radical —X—C₁–C₄alkyl, in which X is a bridging member of the formula —O—,

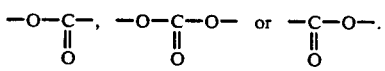

3. A dye according to claim 2, in which X is a bridging member of the formula

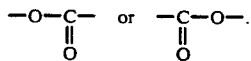

4. A dye according to claim 1, in which R₂ is an unsubstituted C₁–C₄alkyl radical or a C₂–C₄alkyl radical which is substituted by hydroxyl or a radical —X—C₁–C₄alkyl, in which X is a bridging member of the formula —O—,

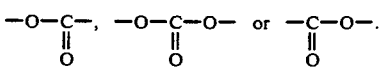

5. A dye according to claim 1, in which R₂ is methyl, ethyl, hydroxyethyl or C₂–C₄alkyl which is substituted by a radical —X—C₁–C₄alkyl, in which X is a bridging member of the formula

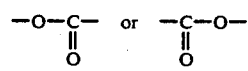

6. A dye according to claim 1, in which R₃ is an unsubstituted C₁–C₄alkyl radical or a C₂–C₄alkyl radical which is substituted by C₁–C₄alkoxy.

7. A dye according to claim 1, in which R₃ is methyl, ethyl or C₂–C₄alkyl which is substituted by methoxy or ethoxy.

8. A dye according to claim 1, in which
R₁ is a C₂–C₄alkyl radical which is substituted by hydroxyl or a radical —X—C₁–C₄alkyl, in which X is a bridging member of the formula —O—,

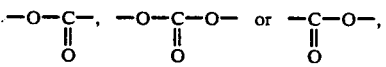

R₂ is methyl, ethyl, hydroxyethyl, or C₂–C₄alkyl which is substituted by a radical —X—C₁–C₄alkyl, in which X is a bridging member of the formula

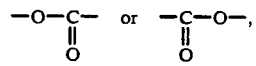

with the proviso that R₁ is different from R₂ and R₃ is methyl, ethyl or C₂–C₄alkyl which is substituted by methoxy or ethoxy.

9. A process for the dyeing or printing of semisynthetic or synthetic hydrophobic fibre material, which comprises applying one or more of the compounds defined in claim 1 to the material mentioned or incorporating it/them therein.

10. A process according to claim 9, in which the hydrophobic material comprises polyester fibres.

11. A material dyed or printed according to claim 9.

12. A process according to claim 9, in which the hydrophobic fibre material is a textile material.

* * * * *